(12) United States Patent
Mott et al.

(10) Patent No.: US 10,116,016 B2
(45) Date of Patent: Oct. 30, 2018

(54) THERMAL MANAGEMENT SYSTEM AND METHOD OF MAKING AND USING THE SAME

(71) Applicant: BorgWarner Inc., Auburn Hills, MI (US)

(72) Inventors: Philip J. Mott, Dryden, NY (US); Andrew Duncan Sutherland, Birmingham, MI (US); Christopher P. Thomas, Commerce, MI (US); Steven Michael Myers, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/161,557

(22) Filed: May 23, 2016

(65) Prior Publication Data
US 2017/0338532 A1 Nov. 23, 2017

(51) Int. Cl.
| | |
|---|---|
| *H01M 10/617* | (2014.01) |
| *H01M 10/6551* | (2014.01) |
| *H01M 10/6556* | (2014.01) |
| *H01M 2/10* | (2006.01) |
| *H01M 10/6557* | (2014.01) |
| *H01M 10/659* | (2014.01) |

(52) U.S. Cl.
CPC ....... *H01M 10/617* (2015.04); *H01M 2/1094* (2013.01); *H01M 10/659* (2015.04); *H01M 10/6551* (2015.04); *H01M 10/6556* (2015.04); *H01M 10/6557* (2015.04)

(58) Field of Classification Search
CPC ........... H01M 10/617; H01M 10/6551; H01M 10/6556

USPC ............................................. 429/50
See application file for complete search history.

(56) References Cited

U.S. PATENT DOCUMENTS

| | | | | |
|---|---|---|---|---|
| 5,231,356 | A * | 7/1993 | Parker | G01D 7/005 324/104 |
| 5,643,480 | A * | 7/1997 | Gustavsson | A41D 13/0051 219/211 |
| 5,817,423 | A * | 10/1998 | Kajimaru | H01C 7/027 100/92 |
| 6,093,909 | A * | 7/2000 | Beetz | B60H 1/2221 219/202 |
| 6,797,427 | B2 * | 9/2004 | Maleki | H01M 2/1094 429/120 |
| 2002/0177035 | A1 * | 11/2002 | Oweis | H01M 10/615 429/120 |

(Continued)

FOREIGN PATENT DOCUMENTS

CN 104037472 A * 9/2014 .......... H01M 10/625

OTHER PUBLICATIONS

Machine translation of CN104037472A.*

*Primary Examiner* — Stewart A Fraser
*Assistant Examiner* — Victoria H Lynch
(74) *Attorney, Agent, or Firm* — BrooksGroup (57) ABSTRACT

A number of variations may include a product including a thermal management component comprising a housing comprising a first polymer wherein the first polymer is constructed and arranged to provide thermal control of at least one neighbor component comprising an exterior surface in contact with the thermal management component wherein the first polymer comprises a heat generating polymer.

26 Claims, 2 Drawing Sheets

(56) References Cited

U.S. PATENT DOCUMENTS

| | | | |
|---|---|---|---|
| 2005/0089750 A1* | 4/2005 | Ng | H01M 2/0242 |
| | | | 429/120 |
| 2008/0116191 A1* | 5/2008 | Allen | H05B 3/845 |
| | | | 219/219 |
| 2010/0316821 A1* | 12/2010 | Chang | B29C 47/0021 |
| | | | 428/35.8 |
| 2012/0327596 A1* | 12/2012 | Anderson-Straley | |
| | | | H01M 10/625 |
| | | | 361/689 |
| 2016/0264018 A1* | 9/2016 | Choufany | H01M 10/6551 |
| 2017/0005381 A1* | 1/2017 | Harris | H01M 10/6556 |

* cited by examiner

THERMAL MANAGEMENT SYSTEM AND METHOD OF MAKING AND USING THE SAME

TECHNICAL FIELD

The field to which the disclosure generally relates to includes thermal management systems for components including, but not limited to, battery systems.

BACKGROUND

In a number of variations, some components may operate more efficiently if kept within a certain range of temperature values.

SUMMARY OF ILLUSTRATIVE VARIATIONS

A number of variations may include a product which may include: a thermal management component comprising a housing comprising a first polymer wherein the thermal management component is constructed and arranged to provide thermal control of at least one neighbor component comprising an exterior surface in contact with the thermal management component wherein the first polymer comprises a heat generating polymer.

A number of variations may include a system which may include: a thermal management component comprising a housing comprising a first polymer wherein the thermal management component is constructed and arranged to provide thermal control of a plurality of neighbor components comprising a plurality of exterior surfaces in contact with the thermal management component simultaneously wherein the first polymer comprises a heat generating polymer.

A number of variations may include a method which may include: providing a thermal management component comprising a housing comprising a first polymer wherein the thermal management component is constructed and arranged to provide thermal control of at least one neighbor component comprising an exterior surface in contact with the thermal management component wherein the first polymer comprises a heat generating polymer; and operating the thermal management component to provide thermal control of the least one neighbor component in contact with the thermal management component to optimize the temperature profile of the at least one neighbor component.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figures 1A, 1B:
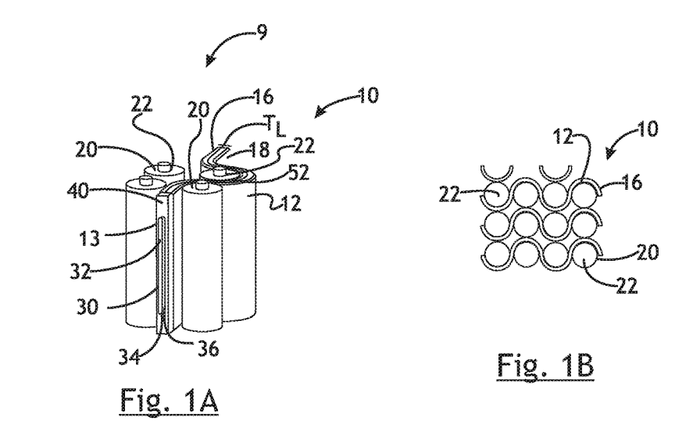
FIG. 1A is a schematic illustration of a product according to a number of variations.
FIG. 1B is a schematic illustration of a product according to a number of variations.
Figure 1C:
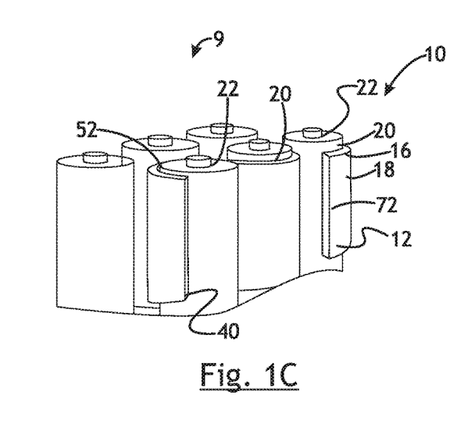
FIG. 1C is a schematic illustration of a product according to a number of variations.
Figure 1D:
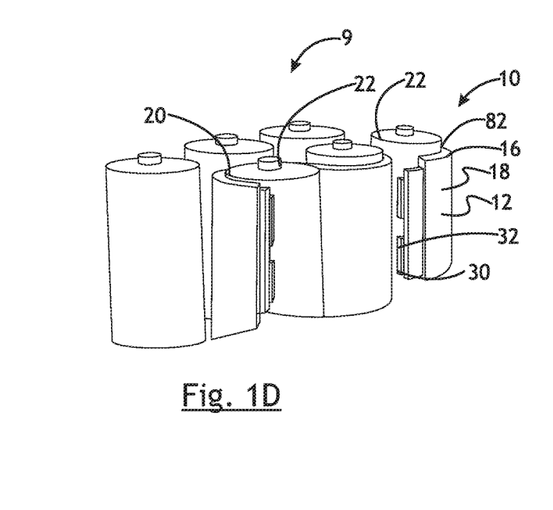
FIG. 1D is a schematic illustration of a product according to a number of variations.
Figure 1E:
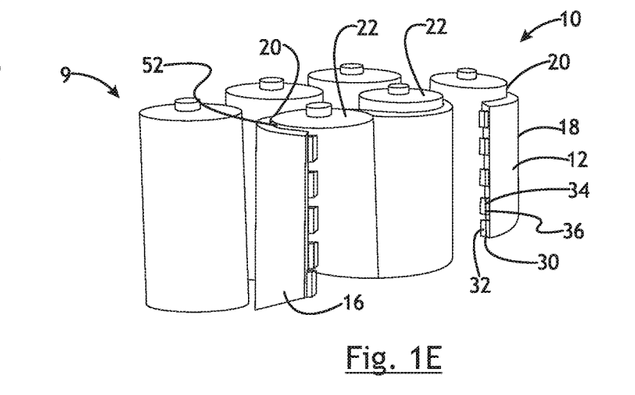
FIG. 1E is a schematic illustration of a product according to a number of variations.
Figure 2A:
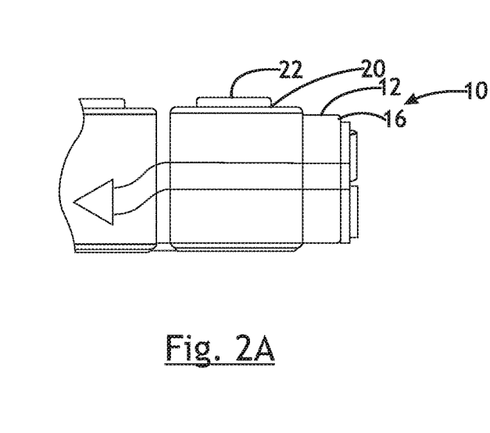
FIG. 2A is a schematic illustration of a product according to a number of variations.
Figure 2B:
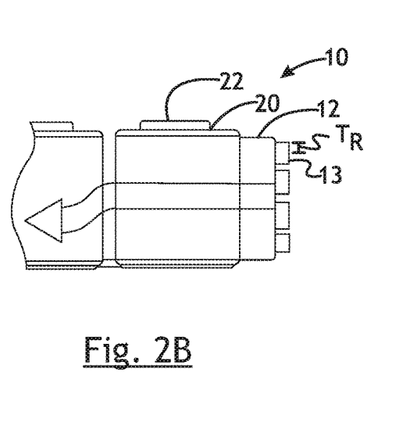
FIG. 2B is a schematic illustration of a product according to a number of variations.
Figure 2C:
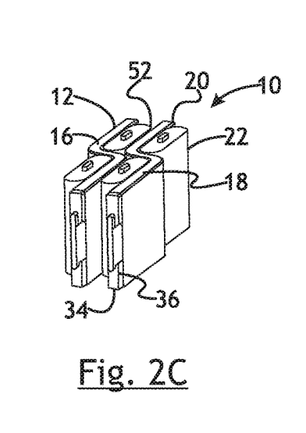
FIG. 2C is a schematic illustration of a product according to a number of variations.
Figure 2D:
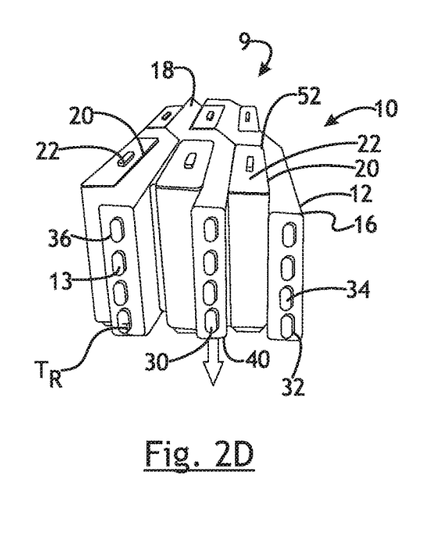
FIG. 2D is a schematic illustration of a product according to a number of variations.
Figure 2E:
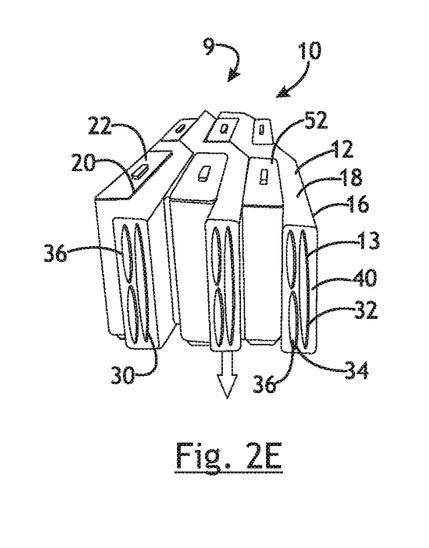
FIG. 2E is a schematic illustration of a product according to a number of variations.
Figure 2F:
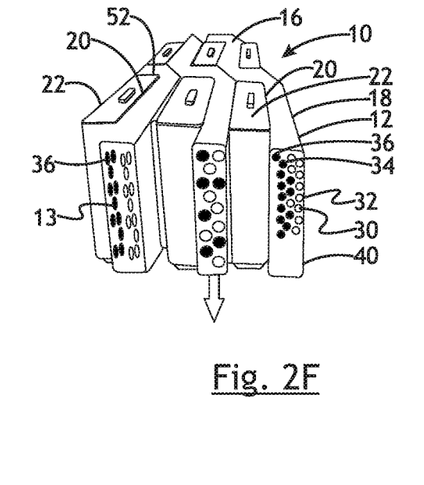
FIG. 2F is a schematic illustration of a product according to a number of variations.

FIGS. 1A-2F illustrate a product 10 according to a number of variations. In a number of variations, the product 10 may include a thermal management component 12. In a number of variations, the thermal management component 12 may include a housing 16. In a number of variations, the thermal management component 12 and/or housing 16 may include a first polymer 18. In a number of variations, the first polymer 18 may include a heat generating polymer. In a number of variations, the thermal management component 12 and/or its housing 16 may be in contact with an exterior surface 20 of at least one neighbor component 22. In a number of variations, at least one of the thermal management component 12, housing 16 or first polymer 18 may be constructed and arranged to provide thermal control of at least neighbor component 22 and/or its exterior surface 20. In a number of variations, "thermal control" may be defined to mean control of the temperature of the neighbor component 22 through heating and/or cooling the neighbor component 22 to keep the neighbor component 22 into an optimum temperature range. In a number of variations, the neighbor component 22 may be a battery. In a number of variations, the neighbor component 22 may be a battery comprising lithium ion, nickel metal hydride (NiMH), lead acid, lithium polymer, lithium-oxygen, lithium sulfur, silicon, magnesium ion, combinations thereof or may be another type. In a number of variations, the thermal management component may be applied to a plurality of neighbor components 22 comprising a plurality of exterior surfaces 20. In a number of variations, a system 9 may be formed from at least one thermal management component 12 and at least one neighbor component 22. In a number of variations, the thermal management component 12 and/or its housing 16 may comprise a cooling channel 30. In a number of variations, the thermal management component 12 and/or cooling channel 30 may comprise a coolant 32. In a number of variations, the thermal management component 12 and/or its housing 16 may comprise a phase change material 34. In a number of variations, the phase change material 34 may be within a phase change material channel 36.

In a number of variations, as shown in FIGS. 1A-2F, the thermal management component 12 may comprise a housing 16. In a number of variations, the housing may comprise the first polymer 18. In a number of variations, the first polymer 18 may comprise a heat generating polymer. In a number of variations, the housing 16 may comprise a layer or a plurality of layers. In a number of variations, the housing 16 may comprise a fabric or fiber or a plurality of fibers. In a number of variations, the housing 16 may be a fabric or fiber which may be textile, polymeric, natural, synthetic, or may be another type. In a number of variations, the housing 16 fabric or fiber may be manufactured or woven through weaving, knitting, braiding, stitching, plain weaving, satin weaving, or may be manufactured another way. In a number of variations, the housing 16 may comprise a metal or metallic compound. In a number of variations, the housing 16 may be formed through metal forming, forging, molding, flow forming, rolling, extrusion, laser cladding, metalworking, sintering, machining, or fabrication. In a number of variations, the housing may comprise a material including, but not limited to, metal, plastic, or polymer foam, plastic steel, stainless steel, copper, nickel, tin, noble metals, zinc, iron, bronze, aluminum, silicon, titanium, platinum, shellac, amber, aramid (including Twaron, Kevlar, Technora, Nomex), silk, leather, rubber, natural rubber, synthetic rubber, silicone rubber, fluoroelastomer rubber, butyl rubber (isobutylene-isoprene), hypalon rubber (chlorosulphonated polyethylene), epichlorohydrin rubber (epichlorohydrin), ethylene propylene diene rubber, fluorocarbon rubber, fluorosilicone rubber, hydrogenated nitrile rubber, nitrile rubber, perfluoroelastomer rubber, polyacrylic rubber, chloroprene rubber, polyurethane rubber, styrene butadiene rubber, acrylonitrile-butadiene rubber, hydrogenated acrylonitrile-butadiene rubber, ethylene acrylic rubber, phenol formaldehyde, polyether urethane, polyester urethane, neoprene, nylon, polyvinyl chloride, polystyrene, polyethylene, polypropylene, polyurethane, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, combinations thereof, or may be another type. In a number of variations, the thermal management component 12 and/or housing 16 may comprise or form at least one of closed end, open end tubes, or closed end/open end tube 13 to allow for the cooling channels 30 housing the coolant material 32. In a number of variations, the tube 13 may comprise the cooling channel 30. In a number of variations, the thermal management component 12 and/or housing 16 may comprise or form at least one of closed end, open end tubes, or closed end/open end tube 13 to allow for the phase change material channels 36 housing the phase change material 34. In a number of variations, the tube 13 may comprise the phase change material channel 36. In a number of variations, the tube 13 may comprise any of the materials of the housing 16. In a number of variations, the tube 13 may have a cross-sectional shape of any shape including, but not limited to, circle, ellipse, polygonal, triangle, parallelogram, pentagon, hexagon, nonagon, decagon, n-gon, or may be another cross-sectional shape. In a number of variations, the cross-sectional shape may be varied over time. In a number of variations, a plurality of tubes 13 may have different or the same cross-sectional shape. In a number of variations, the tube 13 may have a length $T_L$. In a number of variations, a plurality of tubes 13 may have different or the same lengths $T_L$. In a number of variations, the tube 13 may have a radius $T_R$. In a number of variations, a plurality of tubes 13 may have different or the same radii $T_R$. In a number of variations, the tube 13 radius $T_R$ may vary along its length in at least one of the tubes 13. In a number of variations, at least one of the coolant 30 or phase change material 34 may flow through the tube 13. In a number of variations, as shown in FIGS. 1A-2F, the orientation of the tubes 13 may be varied in orientation and size in a number of different variations of the thermal management component 12 or thermal management system 9. In a number of variations, at least one of the coolant 30 or phase change material 34 may be static within the tube 13. In a number of variations, the housing 16 may be made entirely of heat generating polymer. In a number of variations, the thermal management component 12 may be made entirely of heat generating polymer. In a number of variations, the thermal management component 12 or housing 16 may be elastic, bendable, malleable, ductile, or rigid. In a number of variations, the thermal management component 12 or housing 16 may be allowed to bend around the neighbor component 22. In a number of variations, the thermal management component 12 may at least partially surround the neighbor component 22. In a number of variations, the thermal management component 12 or housing 16 may be any shape (including, but not limited to, a sphere, an oval, a cube, a bag, a pyramid, a shape with a polygonal cross-section, or an amorphous object) and any size to fit the desired application and may be modified to fit around certain aspects of the neighbor component 22 or plurality of neighbor components 22. In a number of variations, the thermal management component 12 may fully surround the neighbor component 22. In a number of variations, the thermal management component 12 may cover between $0\% \leq X \geq 100\%$ of the exterior surface 20 of the neighbor component 22.

In a number of variations, as shown in FIGS. 1A-2F, the thermal management component 12 may comprise a first polymer 18. In a number of variations, the first polymer 18 may comprise a heat generating polymer 18. In a number of variations, the heat generating polymer 18 may release heat via Joule heating or be exothermic upon chemical reaction, magnetization, phase change, or another condition acting on the heat generating polymer 18. In a number of variations, the first polymer 18 or heat generating polymer 18 may comprise a polymer which exhibit positive temperature coefficient (PTC) behavior, i.e. which show a sharp increase in resistivity over a particular range. In a number of variations, the first polymer 18 or heat generating polymer 18 may comprise a PTC polymer. In a number of variations, as the PTC polymer 18 is heated or power is applied to the PTC polymer 18, the polymer may expand and/or may change from a crystalline state to an amorphous "tripped" state (once it reaches its "trip temperature," offering higher resistance due to the separation of carbon particles and as the mean distance between the conductive particles increases, causing a breaking of conductive pathways caused by the expansion. In a number of variations, the "trip temperature" may be defined by the expansion rate of the PTC polymer 18 as it heats up and the concentration of conductive particles. In a number of variations, the "trip temperature" of the PTC polymer 18 may be between $40 \geq X \geq 100°$ C. In a number of variations, this results in a positive temperature coefficient of resistance curve for the first polymer 18 or heat generating polymer 18. In a number of variations, once the heat or power is removed, the PTC polymer 18 may regain its original crystalline structure and may return to its low resistance state. In a number of variations, the PTC polymer 18 may be manufactured to bury electrodes within the polymer along with conductive particles. In a number of variations, the PTC polymer 18 may have a non-conductive surface. In a number of variations, the heat generating polymer 18 may comprise a material whose electrical resistivity increases as a function of temperature. In a number of variations, the heat generating polymer 18 may include a ceramic including, but not limited to zinc oxide, antimony trioxide or clay. In a number of variations, the heat generating polymer 18 may include doped or undoped barium titanate ($BaTiO_3$). In a number of variations, the heat generating polymer 18 may include at least one of high-density polyethene, ethene copolymer, or carbon black. In a number of variations, the heat generating polymer 18 may be comprised of $Ba_{0.85}$ $Sr_{0.115}$ $Pb_{0.035}$ $TiO_3$, with the additional presence of approximately 0.24 mol. % $Sb_2O_3$ and 0.08 mol. % $MnCO_3$ (before sintering). In a number of variations, at least one of the heat generating polymer 18 or thermal management component 12 may have a resistivity at room temperature (25 C.) is approximately $10^{-3} \geq X \geq 1000$ Ω·cm. In a number of variations, the first polymer 18 or heat generating polymer 18 may include a polymer material including, but not limited to, aramid (including Twaron, Kevlar, Technora, Nomex), rubber, synthetic rubber, phenol formaldehyde, neoprene, nylon, polyvinyl chloride, polystyrene, polyethylene, polypropylene, polyacrylonitrile, PVB, silicone, plastic, bioplastic, PET, PVDC, PA PTFE, PEO, PPY, PANT, PT, PPS, PPV, PAC, high density polyethylene (HDPE) with carbon black particulates, low density polyethylene (LDPE) with carbon black particulates, polyvinylidene fluoride with carbon black particulates, HDPE with nickel particulates, HDPE with titanium carbide particulates, heat conductive PTC polymer, polyester, vinyl polymer, polyolefin, polyacetylene, phenolic resin, polyanhydride, epoxy, phenolic, polyimide, PEEK, acetate, triacetate, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), mixtures thereof, or may be another type. In a number of variations, the PTC polymer 18 may include HDPE with carbon black particulates having a "trip temperature" of about 120° C. and a resistivity ranging from $0.2 \geq X \geq 1000$ Ω·cm. In a number of variations, the PTC polymer 18 may include LDPE with carbon black particulates having a "trip temperature" of about 100° C. and a resistivity ranging from $0.5 \geq X \geq 1000$ Ω·cm. In a number of variations, the PTC polymer 18 may include polyvinylidene fluoride with carbon black particulates having a "trip temperature" of about $151 \geq X \geq 170°$ C. and a resistivity ranging from $0.5 \geq X \geq 1000$ Ω·cm. In a number of variations, the PTC polymer 18 may include HDPE with nickel particulates having a "trip temperature" of about 120° C. and a resistivity ranging from $10^{-3} \geq X \geq 1000$ Ω·cm. In a number of variations, the PTC polymer 18 may include HDPE with titanium carbide particulates having a "trip temperature" of about 120° C. and a resistivity ranging from $10^{-2} \geq X \geq 1000$ Ω·cm. In a number of variations, the PTC polymer 18 may include heat conductive PTC polymer 18. In a number of variations, the PTC polymer 18 may be E-beam modified where the PTC polymer 18 undergoes an E beaming modification to the carbon-hydrogen chains of the PTC polymer 18 to create the PTC effect in the polymer. In a number of variations, the first polymer 18 and/or heat generating polymer 18 may be formed via a method including, but not limited to, injection moulding, extrusion moulding, structural foam, vacuum forming, extrusion blow moulding, a hand lay-up operation, a spray lay-up operation, a pultrusion operation, a chopped strand mat, vacuum bag moulding, pressure bag moulding, autoclave moulding, resin transfer moulding, vacuum assisted resin transfer moulding, bladder moulding, compression moulding, mandrel wrapping, wet layup, chopper gun, filament winding, melting, staple fiber, continuous filament, 2D or 3D printing, additive manufacture, or may be formed another way. In a number of variations, the heat generating polymer 18 may be printed on the first polymer 18 within the thermal management component 12. In a number of variations, the first polymer 18 and/or heat generating polymer 18 may be stored within the housing 16. In a number of variations, the first polymer 18 and/or heat generating polymer 18 may be stored within the tube 13. In a number of variations, the first polymer 18 and/or heat generating polymer 18 may be constructed and arranged for thermal energy transfer to or from the thermal management component 12 to the neighbor component 22. In a number of variations, the first polymer 18 and/or heat generating polymer 18 may be constructed and arranged for thermal energy transfer to or from the thermal management component 12 to the neighbor component 22 to keep the neighbor component within an optimum temperature range of $0° C. \geq X \geq 50°$ C.

In a number of variations, as shown in FIGS. 1A-2F, the thermal management component 12 may comprise a cooling channel 30 and/or comprising a coolant material 32. In a number of variations, the coolant material 32 may comprise at least one of oil, engine coolant, water, transmission fluid, battery fluid, air, paraffin, antifreeze, propylene glycol, carbon tetrachloride, trichlorofluoromethane, dichlorodifluoromethane, bromochlorodifluoromethane, dibromodifluoromethane, methane, hexachloroethane, pentachlorofluoroethane, trifluoromethane, dichloromethane, chlorofluoromethane, fluoromethane, hexachloroethane, pentachlorofluroethane, fluoroethane, ethane, dimethyl ether, ocafluoropropane, propane, chloropropane, ethoxyethane, pentane, isobutene, isopentane, butane, methyl formate, methylamine, ethylamine, hydrogen, helium, ammonia, nitrogen, oxygen, argon, carbon dioxide, nitrous oxide, sulfur dioxide, krypton, tetrafluoroethylene, trichloroethylene, chloroethylene, fluoroethylene, ethane, hexafluoropropylene, propene, a chlorofluorocarbon, a chlorofluoroolefin, a hydrochlorofluorocarbon, a hydrochlorofluoroolefin, a hydrofluorocarbon, a hydrofluoroolefin, a hydrochlorocarbon, a hydrochloroolefin, a hydrocarbon, a perfluorocarbon, a perfluoroolefin, a perchlorocarbon, a perchloroolefin, a halon, ethylene glycol, mixtures thereof, or may be another type. In a number of variations, the coolant material 32 may be of any concentration of the above recited material. In a number of variations, the coolant material 32 may be stored within the housing 16. In a number of variations, the coolant material 32 may be stored within the tube 13. In a number of variations, the coolant material 32 may be constructed and arranged for thermal energy transfer to or from the thermal management component 12 to the neighbor component 22. In a number of variations, the coolant material 32 may be constructed and arranged for thermal energy transfer to or from the thermal management component 12 to the neighbor component 22 to keep the neighbor component within an optimum temperature range of 0° C.≥X≥50° C.

In a number of variations, as shown in FIGS. 1A-2F, the thermal management component 12 may comprise a phase change material channel 36 and/or a phase change material 34. In a number of variations, the phase change material may be a thermal substance going through a reversible change in physical state, storing at least partially recoverable heat energy during its transition between phases (solidus to liquidus for example). In a number of variations, this heat energy may be termed the "Latent Heat of Fusion." In a number of variations, the phase change material 34 may be organic or inorganic, hydrates of salts, ionic liquids, synthesized polymers, or any other material that absorb and release latent heat energy during a physical change in phase (including solid-solid). In a number of variations, the phase change material 34 may be renewable or non-renewable. In a number of variations, the phase change 34 material may comprise a material comprising at least one of plant-based PCMs, pure salts (ionic compounds comprising at least in part of a metal or other cation), metals (including, but not limited to, lead, lithium, silver, zinc, aluminum) metal hydrides, high molecular weight hydrocarbons (paraffins, for example), hydrated salts (Hydrates of Sodium Acetate, Hydrates of Calcium Chloride, or may be another type), hydrated salts in solution, organic phase change materials (including but not limited to, paraffins, waxes, hydrogenated oils, polyglycols, fatty acids, or may be another type), methyl oleate, linoleic acid, ethyl laurate, methyl laurate, isopropyl myristate, isopropyl palmitate, oleic acid, isopropyl stearate, capric acid, lauric acid, propyl palmitate, caprylic acid, methyl myristate, dodecane, undecane, NaCl+ $H_2O$, Al($NO_3$)+$H_2O$, KCL+$H_2O$, diethylene glycol, triethylene glycol, $H_2O$+polyacrylamide, heptadecane, hexadecane, glycerin, acetic acid, pentadecane, tetrabutyl ammoniumbromide (type A and type B), formic acid, tetradecane, tetrahydrofurano (THF), $LiNO_3$+$H_2O$, Zn($NO_3$)+ $H_2O$, $CaCl_2$+$H_2O$, $CaBr_2$+$H_2O$, Magnesium Nitrate Hexahydrates, mixtures thereof, or may be another type. In a number of variations, the phase change material 34 may be of any concentration of the above recited material. In a number of variations, the phase change material 34 may change phase, releasing thermal energy below about or near 25° C. In a number of variations, the phase change material 34 may change phase, absorbing thermal energy above about or near 25° C. In a number of variations, the phase change material 34 may change phase at different temperatures in both a releasing and absorbing context depending on the composition and properties of the phase change material 34 used. In a number of variations, the phase change material 34 may be stored within the housing 16. In a number of variations, the phase change material 34 may be stored within the tube 13. In a number of variations, the phase change material 34 may be constructed and arranged for thermal energy transfer to or from the thermal management component 12 to the neighbor component 22. In a number of variations, the phase change material 34 may be constructed and arranged for thermal energy transfer to or from the thermal management component 12 to the neighbor component 22 to keep the neighbor component within an optimum temperature range of 0° C.≥X≥50° C. In a number of variations, the phase change material 34 may be self-contained. In a number of variations, the phase change material 34 may be non-divided, or otherwise complete as one mass within the thermal management component 12 or housing 16. In a number of variations, the phase change material 34 may be micro-encapsulated to form encapsulated microspheres. In a number of variations, the phase change material 34 may be microencapsulated by a polymer comprising polyuria-formaldehyde. In a number of variations, the microencapsulation of the phase change material 34 may be done by spray drying, use of organic solvents, fluidized bed processes, centrifugal process, in situ polymerization technique, or may be done another way. In a number of variations, the phase change material 34 may be contained within the housing 16. In a number of variations, the phase change materials 34 may be incorporated into the housing 16 by coating, lamination, finishing, melt-spinning, bi-component synthetic fiber extrusion, injection molding, foam techniques, adhesive, or may be incorporated another way.

In a number of variations, as shown in FIGS. 1A-2F, the thermal management component 12 may contain a fire retardant material 40. In a number of variations, the fire retardant material 40 may include at least one of rock wool, gypsum, asbestos, perlite, calcium silicate, lumber, cotton, jute, kenaf, hemp, flax, brick, concrete, cement render, intumescent paint, glass, fiberglass (including E-glass, A-glass, E-CR-glass, C-glass, D-glass, R-glass, F-glass, S-glass, S-2-glass, Hexel, or may be another type), PBI, Twaron, burnstop, noflan, nylon, carbon foam, kevlar, melamine, wool, modacrylic, Technora, pyrovatex, or may be another type. In a number of variations, the fire retardant material 40 may be stored within the housing 16. In a number of variations, the fire retardant material 40 may be stored within the tube 13.

In a number of variations, as shown in FIGS. 1A-2F, the thermal management component 12 and/or housing 16 may further comprise a binder 52. In a number of variations, the binder 52 may be an extensible binder 52 that allows the thermal management component 12 and/or housing 16 to be extensible. In a number of variations, the binder 52 may be a natural or synthetic adhesive or polymer, and may include starch, animal glue, masonite, casein, natural rubber, polychloroprene, rubber cement, white glue, urethane resin, vinylester resin, acrylic resin, cyanoacrylate resin, polyester resin, epoxy resin, phenolic resin, modified phenolic resin, or may be another type. The binder 52 may be reactive or non-reactive. In a number of variations, the binder 52 may bond the thermal management component 12 and/or housing 16 to the neighbor component 22 at its exterior surface 20.

In a number of variations, the thermal management component 12 may heat at least one neighbor component 22 through its at least one exterior surface 20. In a number of variations, the thermal management component 12 may cool at least one neighbor component 22 through at least one exterior surface 20. In a number of variations, the thermal management component 12 may heat or cool at least one neighbor component 22 based on an ideal temperature range of the neighbor component 22 or plurality of neighbor components. In a number of variations, the neighbor component 22 may be a battery. In a number of variations, the neighbor component 22 may be a battery comprising lithium ion, nickel metal hydride (NiMH), lead acid, lithium polymer, lithium-oxygen, lithium sulfur, silicon, magnesium ion, combinations thereof or may be another type. In a number of variations, the ideal temperature range of the neighbor component 22 may be 0° C.≥X≥50° C. In a number of variations, the neighbor component 22 or battery may have an ideal temperature range where above the range, the battery may degrade quicker and below the range, the battery may not be running at optimum efficiency. In a number of variations, the ideal temperature range may vary depending on the composition and properties of the neighbor component 22 used. In a number of variations, the thermal management component 12 may reduce cost of operating a battery and improve temperature distribution of a battery or plurality of batteries. In a number of variations, the thermal management component 12 may be a flexible ribbon shape as shown in FIGS. 1A-2F. In a number of variations, the thermal management component 12 may reduce temperature variable in a battery or plurality of batteries.

In a number of variations, a method is shown. In a number of variations, the method may include providing a thermal management component 12 comprising a housing 16 comprising a first polymer 18 wherein the thermal management component 12 is constructed and arranged to provide thermal control of at least one neighbor component 22 comprising an exterior surface 20 in contact with the thermal management component 12 wherein the first polymer 18 comprises a heat generating polymer. In a number of variations, the method may further include operating the thermal management component 12 to provide thermal control of the least one neighbor component 22 in contact with the thermal management component 12 to optimize the temperature profile of the at least one neighbor component 22.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a thermal management component comprising a housing comprising a first polymer wherein the thermal management component is constructed and arranged to provide thermal control of at least one neighbor component comprising an exterior surface in contact with the thermal management component wherein the first polymer comprises a heat generating polymer.

Variation 2 may include the product according to variation 1 wherein the thermal management component further comprises a cooling channel comprising a coolant material.

Variation 3 may include the product according to any of variations 1-2 wherein the thermal management component further comprises a phase change material.

Variation 4 may include the product according to any of variations 1-3 wherein the heat generating polymer comprises at least one of high density polyethylene (HDPE) with carbon black particulates, low density polyethylene (LDPE) with carbon black particulates, polyvinylidiene fluoride with carbon black particulates, HDPE with nickel particulates, HDPE with titanium carbide particulates, or heat conductive PTC polymer.

Variation 5 may include the product according to any of variations 1-4 wherein the thermal management component is applied to a battery comprising the exterior surface.

Variation 6 may include the product according to any of variations 1-5 wherein the thermal management component is applied to a plurality of batteries comprising at least one exterior surface.

Variation 7 may include the product according to variation 6 wherein the battery comprises a lithium ion, nickel metal hydride (NiMH), lead acid, lithium polymer, lithium-oxygen, lithium sulfur, magnesium ion, or silicon battery.

Variation 8 may include a system that may include a thermal management component comprising a housing comprising a first polymer wherein the thermal management component is constructed and arranged to provide thermal control of a plurality of neighbor components comprising a plurality of exterior surfaces in contact with the thermal management component simultaneously wherein the first polymer comprises a heat generating polymer.

Variation 9 may include the system according to variation 8 wherein the thermal management component further comprises a cooling channel comprising a coolant material.

Variation 10 may include the system according to any of variations 8-9 wherein the thermal management component further comprises a phase change material.

Variation 11 may include the system according to any of variations 8-10 wherein the heat generating polymer comprises at least one of high density polyethylene (HDPE) with carbon black particulates, low density polyethylene (LDPE) with carbon black particulates, polyvinylidiene fluoride with carbon black particulates, HDPE with nickel particulates, HDPE with titanium carbide particulates, or heat conductive PTC polymer.

Variation 12 may include the system according to any of variations 8-11 wherein the thermal management system is applied to a plurality of batteries comprising at least one exterior surface.

Variation 13 may include the system according to any of variation 12 wherein the plurality of batteries comprises at least one lithium ion, nickel metal hydride (NiMH), lead acid, lithium polymer, lithium-oxygen, lithium sulfur, magnesium ion, magnesium ion, or silicon battery.

Variation 14 may include a method that may include providing a thermal management component comprising a housing comprising a first polymer wherein the thermal management component is constructed and arranged to provide thermal control of at least one neighbor component comprising an exterior surface in contact with the thermal management component wherein the first polymer comprises a heat generating polymer; and operating the thermal management component to provide thermal control of the least one neighbor component in contact with the thermal management component to optimize the temperature profile of the at least one neighbor component.

Variation 15 may include the method according to variation 14 wherein the thermal management component further comprises a cooling channel comprising a coolant material.

Variation 16 may include the method according to any of variations 14-15 wherein the thermal management component further comprises a phase change material.

Variation 17 may include the method according to variations 14-16 wherein the heat generating polymer comprises at least one of high density polyethylene (HDPE) with carbon black particulates, low density polyethylene (LDPE) with carbon black particulates, polyvinylidiene fluoride with carbon black particulates, HDPE with nickel particulates, HDPE with titanium carbide particulates, or heat conductive PTC polymer.

Variation 18 may include the method according to any of variations 14-17 wherein the thermal management component is applied to a battery comprising the exterior surface.

Variation 19 may include the method according to any of variations 14-18 wherein the thermal management system is applied to a plurality of batteries comprising at least one exterior surface.

Variation 20 may include the method according to any of variation 19 wherein the battery comprises a lithium ion, nickel metal hydride (NiMH), lead acid, lithium polymer, lithium-oxygen, lithium sulfur, magnesium ion, or silicon battery.

The above description of select variations within the scope of the invention is merely illustrative in nature and, thus, variations or variants thereof are not to be regarded as a departure from the spirit and scope of the invention.

What is claimed is:
1. A product comprising:
a thermal management component comprising a housing comprising a first polymer wherein the thermal management component is constructed and arranged to provide thermal control of at least one neighbor component comprising an exterior surface in contact with the thermal management component wherein the first polymer comprises a heat generating polymer, and further comprising cooling tubes in the housing, and a phase change material in the cooling tubes, the phase change material being constructed and arranged to absorb thermal energy above a first temperature and to reversibly release thermal energy below a second temperature, and further comprising a plurality of batteries each having an external surface and wherein the housing is in contact with the external surface of each of the plurality of batteries, wherein the heat generating polymer comprises a PTC polymer, the PTC polymer comprising electrically conductive particles, the PTC polymer being constructed and arranged to change from a crystalline state to an amorphous tripped state once the PTC polymer reaches its trip temperature thereby causing a higher resistance due to the separation of the electrically conductive particles and as the mean distance between the conductive particles increases, causing a breaking of conductive pathways caused by the expansion of the PTC polymer in the amorphous state.

2. A product as set forth in claim 1 wherein the heat generating polymer comprises at least one of high density polyethylene (HDPE) with carbon black particulates, low density polyethylene (LDPE) with carbon black particulates, polyvinylidiene fluoride with carbon black particulates, HDPE with nickel particulates, HDPE with titanium carbide particulates, or heat conductive PTC polymer.

3. A product as set forth in claim 1 wherein each of the batteries comprises a lithium ion, nickel metal hydride (NiMH), lead acid, lithium polymer, lithium-oxygen, lithium sulfur, magnesium ion, or silicon battery.

4. The product of claim 1 wherein the thermal management component comprises the coolant material in cooling tubes.

5. A product as set forth in claim 1 wherein the thermal management component is constructed and arranged to maintain the temperature of the plurality of batteries in a range of $0°\ C. \geq X \geq 50°\ C$.

6. A product as set forth in claim 1 wherein the thermal management component further comprises a cooling channel and a coolant material in the cooling channel, and wherein the coolant material comprises at least one of oil, engine coolant, water, transmission fluid, battery fluid, air, paraffin, antifreeze, propylene glycol, carbon tetrachloride, trichlorofluoromethane, dichlorodifluoromethane, bromochlorodifluoromethane, dibromodifluoromethane, methane, hexachloroethane, pentachlorofluoroethane, trifluoromethane, dichloromethane, chlorofluoromethane, fluoromethane, hexachloroethane, pentachlorofluroethane, fluoroethane, ethane, dimethyl ether, ocafluoropropane, propane, chloropropane, ethoxyethane, pentane, isobutene, isopentane, butane, methyl formate, methylamine, ethylamine, hydrogen, helium, ammonia, nitrogen, oxygen, argon, carbon dioxide, nitrous oxide, sulfur dioxide, krypton, tetrafluoroethylene, trichloroethylene, chloroethylene, fluoroethylene, ethane, hexafluoropropylene, propene, a chlorofluorocarbon, a chlorofluoroolefin, a hydrochlorofluorocarbon, a hydrochlorofluoroolefin, a hydrofluorocarbon, a hydrofluoroolefin, a hydrochlorocarbon, a hydrochloroolefin, a hydrocarbon, a perfluorocarbon, a perfluoroolefin, a perchlorocarbon, a perchloroolefin, a halon, or ethylene glycol.

7. A product as set forth in claim 1 wherein the phase change material constructed and arranged to release thermal energy below 25° C. and to absorb thermal energy above 25° C.

8. The product of claim 1 wherein the phase change material comprises at least one of plant-based PCMs, pure salts, metals, metal hydrides, high molecular weight hydrocarbons, hydrated salts, hydrated salts in solution, paraffins, waxes, hydrogenated oils, polyglycols, fatty acids, methyl oleate, linoleic acid, ethyl laurate, methyl laurate, isopropyl myristate, isopropyl palmitate, oleic acid, isopropyl stearate, capric acid, lauric acid, propyl palmitate, caprylic acid, methyl myristate, dodecane, undecane, $NaCl+H_2O$, $Al(NO_3)+H_2O$, $KCL+H_2O$, diethylene glycol, triethylene glycol, $H_2O$+polyacrylamide, heptadecane, hexadecane, glycerin, acetic acid, pentadecane, tetrabutyl ammoniumbromide (type A and type B), formic acid, tetradecane, tetrahydrofurano (THF), $LiNO_3+H_2O$, $Zn(NO_3)+H_2O$, $CaCl_2+H_2O$, $CaBr_2+H_2O$, or Magnesium Nitrate Hexahydrates.

9. A system comprising:
a thermal management component comprising a housing comprising a first polymer wherein the thermal management component is constructed and arranged to provide thermal control of a plurality of neighbor components comprising a plurality of exterior surfaces in contact with the housing simultaneously wherein the first polymer comprises a heat generating polymer, and further comprising cooling tubes in the housing, and a phase change material in the cooling tubes, the phase change material being constructed and arranged to absorb thermal energy above a first temperature and to reversibly release thermal energy below a second temperature, wherein the heat generating polymer comprises a PTC polymer, the PTC polymer comprising electrically conductive particles, the PTC polymer being constructed and arranged to change from a crystalline state to an amorphous tripped state once the PTC polymer reaches its trip temperature thereby causing a higher resistance due to the separation of the electrically conductive particles and as the mean distance between the conductive particles increases, causing a breaking of conductive pathways caused by the expansion of the PTC polymer in the amorphous state.

10. A system as set forth in claim 9 wherein the heat generating polymer comprises at least one of high density polyethylene (HDPE) with carbon black particulates, low density polyethylene (LDPE) with carbon black particulates, polyvinylidiene fluoride with carbon black particulates, HDPE with nickel particulates, HDPE with titanium carbide particulates, or heat conductive PTC polymer.

11. A system as set forth in claim 9 wherein the thermal management system is applied to a plurality of batteries comprising the plurality of exterior surfaces.

12. A system as set forth in claim 11 wherein the plurality of batteries comprises at least one lithium ion, nickel metal hydride (NiMH), lead acid, lithium polymer, lithium-oxygen, lithium sulfur, magnesium ion, or silicon battery.

13. A system as set forth in claim 9 wherein the phase change material constructed and arranged to release thermal energy below 25° C. and to absorb thermal energy above 25° C.

14. A method comprising:
providing a thermal management component comprising a housing comprising a first polymer wherein the thermal management component is constructed and arranged to provide thermal control of at least one neighbor component comprising an exterior surface in contact with the housing, and wherein the first polymer comprises a heat generating polymer, and further comprising cooling tubes in the housing, and a phase change material in the cooling tubes, the phase change material being constructed and arranged to absorb thermal energy above a first temperature and to reversibly release thermal energy below a second temperature, wherein the heat generating polymer comprises a PTC polymer, the PTC polymer comprising electrically conductive particles, the PTC polymer being constructed and arranged to change from a crystalline state to an amorphous tripped state once the PTC polymer reaches its trip temperature thereby causing a higher resistance due to the separation of the electrically conductive particles and as the mean distance between the conductive particles increases, causing a breaking of conductive pathways caused by the expansion of the PTC polymer in the amorphous state; and
operating the thermal management component to provide thermal control of the least one neighbor component in contact with the housing to optimize the temperature profile of the at least one neighbor component.

15. A method as set forth in claim 14 wherein the heat generating polymer comprises at least one of high density polyethylene (HDPE) with carbon black particulates, low density polyethylene (LDPE) with carbon black particulates, polyvinylidiene fluoride with carbon black particulates, HDPE with nickel particulates, HDPE with titanium carbide particulates, or heat conductive PTC polymer.

16. A method as set forth in claim 14 wherein the thermal management component is applied to a battery comprising the exterior surface.

17. A method as set forth in claim 14 wherein the thermal management system is applied to a plurality of batteries comprising at least one exterior surface.

18. A method as set forth in claim 17 wherein the battery comprises a lithium ion, nickel metal hydride (NiMH), lead acid, lithium polymer, lithium-oxygen, lithium sulfur, magnesium ion, or silicon battery.

19. A method as set forth in claim 14 wherein the phase change material constructed and arranged to release thermal energy below 25° C. and to absorb thermal energy above 25° C.

20. A product comprising:
a plurality of batteries each having at least one exterior surface, and a housing comprising a flexible ribbon thermal management component comprising a first polymer, wherein the ribbon thermal management component is constructed and arranged to provide thermal control of at least one neighbor battery wherein the exterior surface of the one neighbor battery is in contact with the ribbon thermal management component wherein the first polymer comprises a positive thermal coefficient polymer, wherein the positive thermal coefficient polymer comprising electrically conductive particles, the positive thermal coefficient polymer being constructed and arranged to change from a crystalline state to an amorphous tripped state once the positive thermal coefficient polymer reaches its trip temperature thereby causing a higher resistance due to the separation of the electrically conductive particles and as the mean distance between the conductive particles increases, causing a breaking of conductive pathways caused by the expansion of the positive thermal coefficient polymer in the amorphous state.

21. A product as set forth in claim 20 wherein the ribbon thermal management component is flexible.

22. A product as set forth in claim 20 further comprising a coolant material in the ribbon thermal management component.

23. A product as set forth in claim 20 wherein the housing has at least one cooling channel formed therein and further comprising a coolant material in the at least one cooling channel.

24. A product as set forth in claim 20 further comprising at least one cooling tube formed in the housing, and a coolant material in the at least one cooling tube.

25. A product as set forth in claim 20 wherein the ribbon thermal management component further comprising a phase change material constructed and arranged to release thermal energy below 25° C. and to absorb thermal energy above 25° C.

26. A product as set forth in claim 25 further comprising a coolant material in the ribbon thermal management component.

* * * * *